(12) United States Patent
Busato

(10) Patent No.: US 10,703,041 B2
(45) Date of Patent: Jul. 7, 2020

(54) STEREOLITHOGRAPHY MACHINE WITH FACILITATED INITIALIZATION

(71) Applicant: DWS S.R.L., Theine (IT)

(72) Inventor: Renzo Busato, Marano (IT)

(73) Assignee: DWS S.R.L., Theine (IT)

( * ) Notice: Subject to any disclaimer, the term of this patent is extended or adjusted under 35 U.S.C. 154(b) by 420 days.

(21) Appl. No.: 15/535,998

(22) PCT Filed: Dec. 22, 2015

(86) PCT No.: PCT/IB2015/059882
§ 371 (c)(1),
(2) Date: Jun. 14, 2017

(87) PCT Pub. No.: WO2016/103178
PCT Pub. Date: Jun. 30, 2016

(65) Prior Publication Data
US 2017/0361528 A1 Dec. 21, 2017

(30) Foreign Application Priority Data
Dec. 23, 2014 (IT) ................ VI2014A0333

(51) Int. Cl.
*B29C 64/124* (2017.01)
*B33Y 30/00* (2015.01)
*B29C 64/40* (2017.01)

(52) U.S. Cl.
CPC ............ *B29C 64/124* (2017.08); *B29C 64/40* (2017.08); *B33Y 30/00* (2014.12)

(58) Field of Classification Search
CPC .................................................. B29C 64/124
(Continued)

(56) References Cited

U.S. PATENT DOCUMENTS 9,914,291 B2 * 3/2018 Ding ................ B33Y 30/00
2008/0170112 A1 * 7/2008 Hull .................. B29C 64/124
347/127

(Continued)

FOREIGN PATENT DOCUMENTS

| EP | 1946909 | 1/2008 |
|---|---|---|
| JP | H058305 | 1/1993 |
| JP | 2010240865 | 10/2010 |

OTHER PUBLICATIONS

Written Opinion of the International Searching Authority regarding PCT/IB2015/059882, dated Apr. 25, 2016 (5 pgs.).

(Continued)

*Primary Examiner* — Matthew J Daniels
*Assistant Examiner* — Hana C Page
(74) *Attorney, Agent, or Firm* — Husch Blackwell LLP

(57) ABSTRACT

A stereolithography machine comprising: a tank provided with a bottom; a modelling plate facing the bottom; a moving unit suited to move the modelling plate according to a direction of movement that is orthogonal to the bottom; a coupling unit between the modelling plate and the moving unit, comprising a first coupling member integral with the moving unit and a second coupling member integral with the modelling plate and movable with respect to the first coupling member according to the direction of movement; tightening means suited to be operated in such a way as to tighten the coupling members against each other according to a tightening direction that is orthogonal to the direction of movement, in order to lock the mutual movement of the coupling members.

12 Claims, 9 Drawing Sheets

(58) Field of Classification Search
USPC .......................................................... 264/401
See application file for complete search history.

(56) References Cited

U.S. PATENT DOCUMENTS

| | | | | |
|---|---|---|---|---|
| 2012/0195994 A1* | 8/2012 | El-Siblani | ............... | B33Y 10/00 425/174.4 |
| 2015/0151489 A1* | 6/2015 | Elsey | .................. | B29C 35/0805 264/401 |
| 2015/0224710 A1* | 8/2015 | El-Siblani | ............... | B33Y 70/00 264/401 |

OTHER PUBLICATIONS

International Searc Report regarding PCT/IB2015/059882, dated Apr. 25, 2016 (6 pgs.).
Machine translation of the Description for JPH058305, dated Nov. 9, 2015 (11 pgs.).
Machine translation of the Claims for JPH058305, dated Nov. 9, 2015 (1 pg.).
Machine translation of the Description for JP2010240865 (7 pgs.).
Machine translation of the claims for JP2010240865 (2 pgs.).
EP 1 946 909 A3, dated Jan. 5, 2010 (3 pgs.).

\* cited by examiner

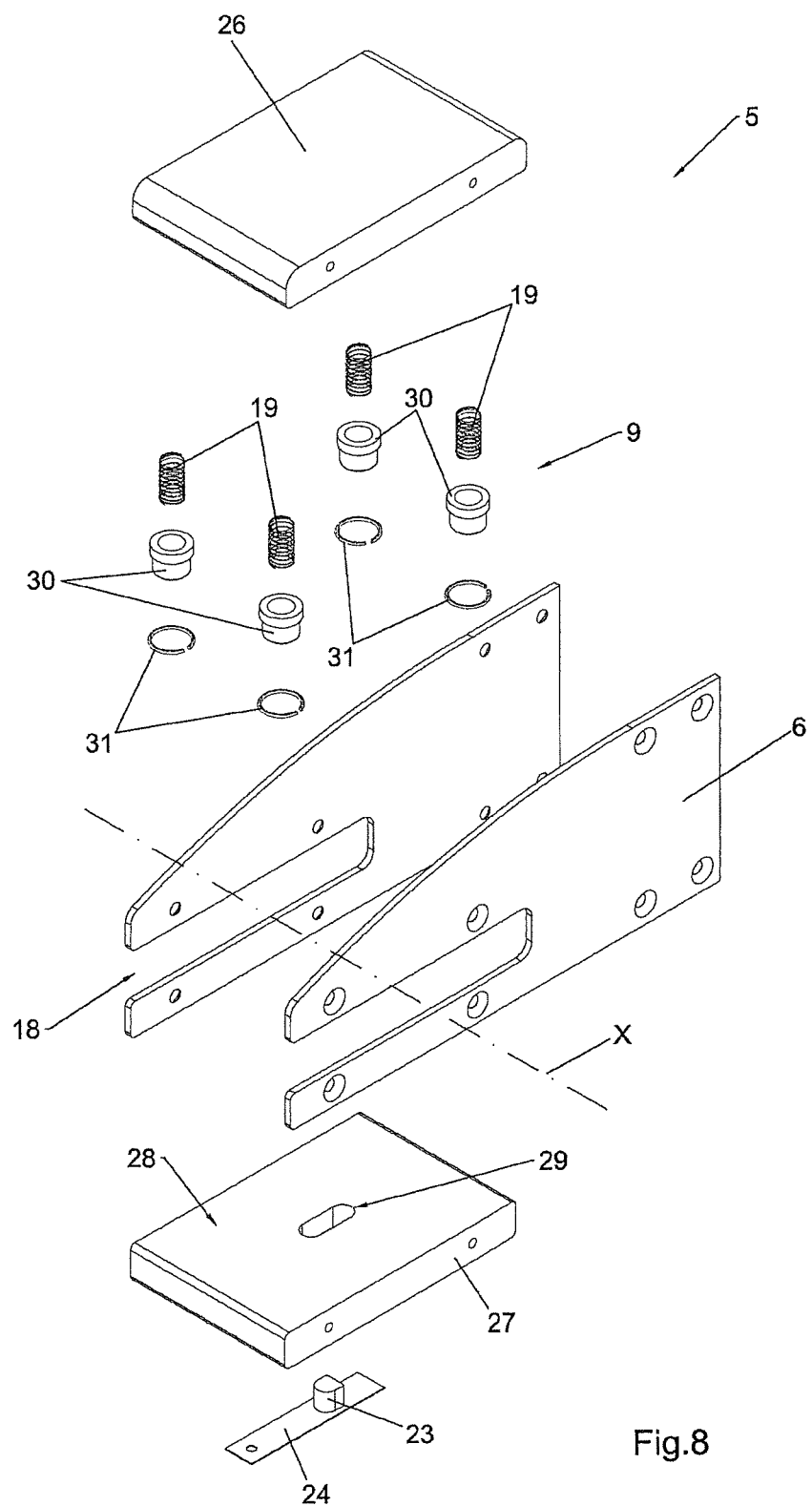

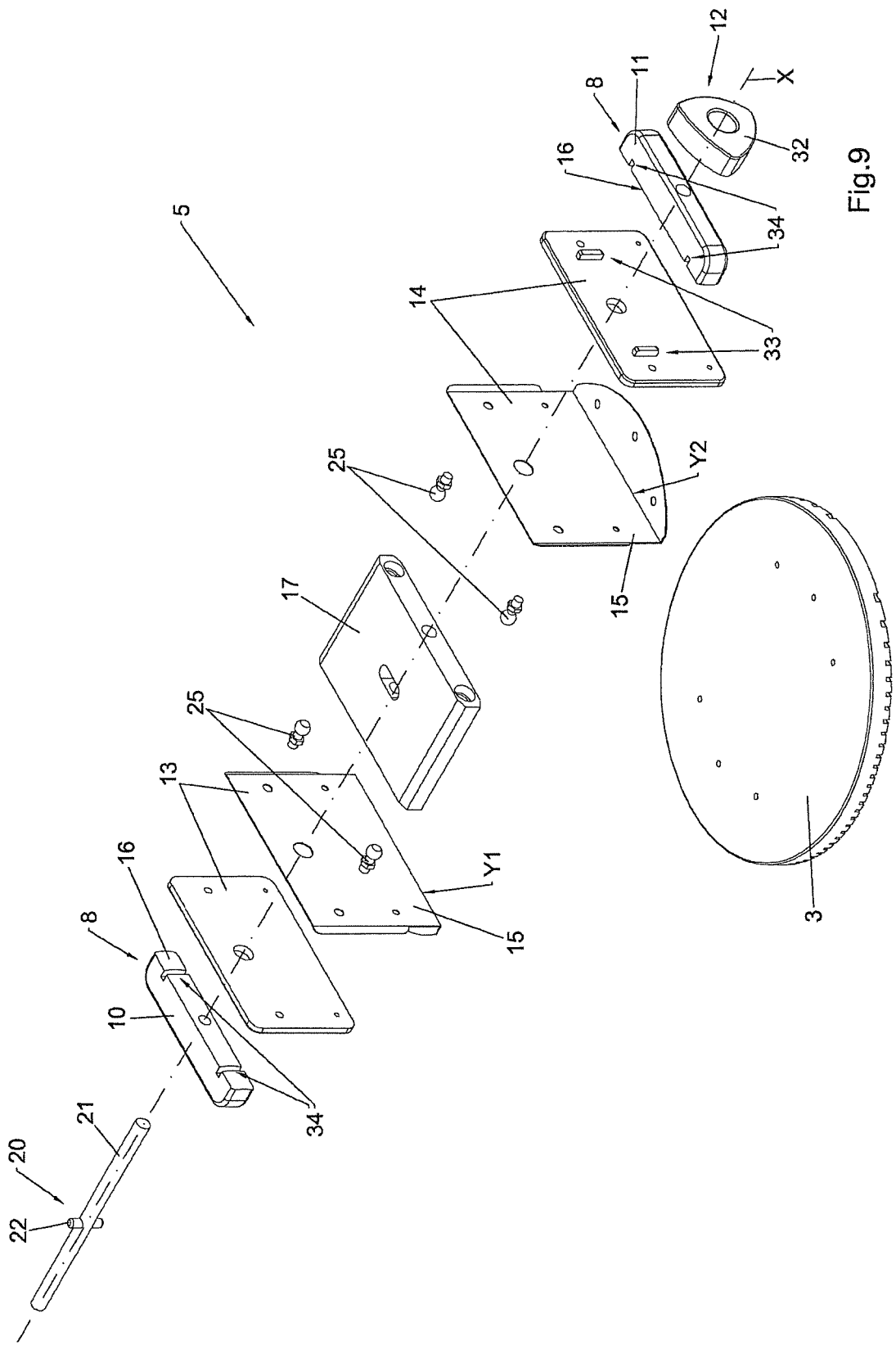

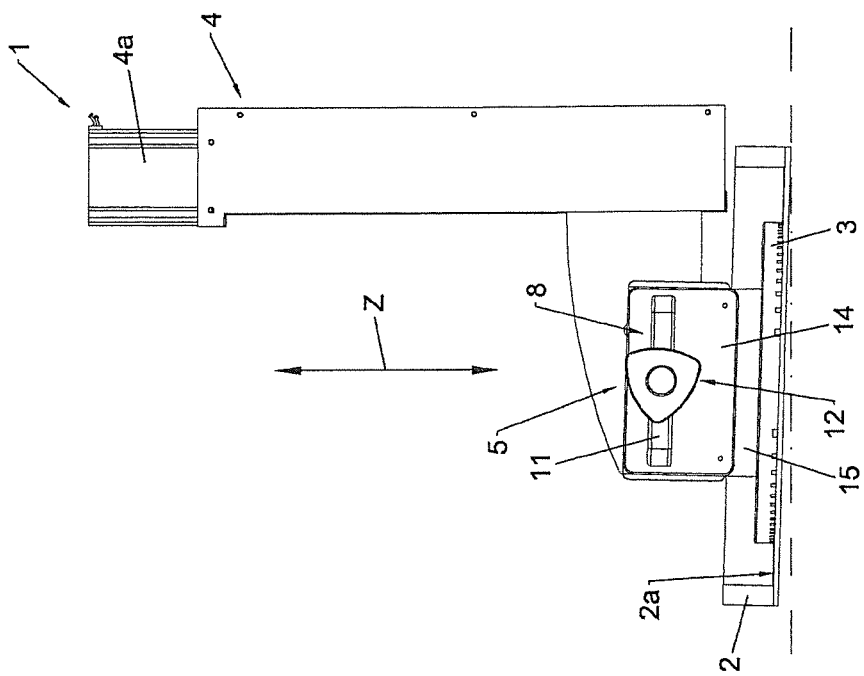
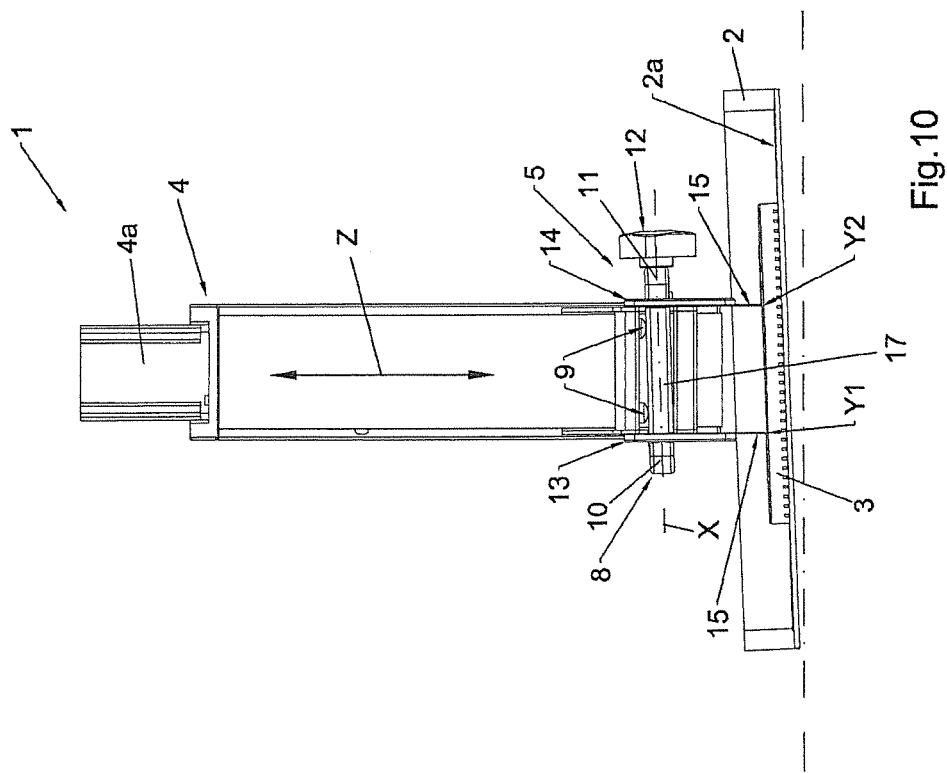

STEREOLITHOGRAPHY MACHINE WITH FACILITATED INITIALIZATION

The present invention concerns a stereolithography machine with very simple initialization which, therefore, is suited to be used even by unskilled operators.

As is known, a stereolithography machine typically comprises a tank suited to contain a light sensitive resin, on the bottom of which there is a modelling plate that faces said bottom and supports a three-dimensional object being formed.

The modelling plate is associated with a moving unit suited to move it according to a direction of movement that is orthogonal to the bottom of the tank.

Before said machine can be used to make a three-dimensional object, it is necessary to initialize it so that the moving unit can arrange the modelling plate autonomously and precisely at any predetermined distance from the bottom of the tank.

Said initialization is necessary as the dimensions of the tank, generally made of a plastic material, are not known in advance and are subjected to tolerances in terms of both size and shape. Therefore, the initialization procedure must be carried out when the machine is used for the first time and each time the tank is replaced.

The initialization avoids both the damages to the bottom of the tank caused by the incorrect positioning of the modelling plate and the processing waste deriving from the imperfect adhesion of the first layers of the object to the modelling plate.

According to the initialization procedure, first of all the modelling plate is placed in contact with the bottom of the tank, maintaining it released from the moving unit, in such a way as to allow it to be directed according to the orientation of the bottom of the tank.

For this purpose, the modelling plate is associated with the moving unit through sliding means that grant the modelling plate a certain degree of relative movement with respect to the moving unit, according to said direction of movement, thus also allowing it to assume a certain inclination.

After placing the modelling plate in contact with the bottom of the tank, the operator acts on apposite adjustable spacer elements projecting from the moving unit towards the modelling plate, and extends them until bringing them in contact with the modelling plate itself.

Successively, the operator uses a screw to exert a traction action on the modelling plate, thus locking it against said spacer elements.

The position obtained in this way is stored by the control system of the moving unit.

The initialization procedure just described above poses the drawback of being rather complicated and, therefore, unsuitable for application by an unskilled operator.

Said procedure poses a further drawback constituted by the fact that, if the various spacer elements are tightened against the modelling plate with different forces, they cause the imprecise positioning of the modelling plate itself.

According to the procedure, to avoid the above mentioned drawback a paper sheet is interposed between the modelling plate and the bottom of the tank. After placing the modelling plate in contact with the bottom of the tank and tightening the spacer elements, the operator makes sure that the paper sheet can still be removed from under the modelling plate, which ensures the absence of localized pressures.

Said operation, however, poses the drawback of making the initialization procedure even more complicated.

Furthermore, due to the interposition of the paper sheet, at the end of the initialization procedure the modelling plate does not rest perfectly on the bottom of the tank, but is spaced from the latter by a distance corresponding to the thickness of the sheet.

As said thickness varies considerably depending on the sheet used, a further drawback is added, represented by the fact that a variable is introduced in the initialization process, thus limiting once again the degree of precision that can be obtained.

Furthermore, the interposition of said sheet causes the limitation represented by the fact that the initialization procedure cannot be carried out with the tank full of resin.

In order to at least partially overcome said drawbacks, a further known embodiment of the stereolithography machine has been developed, in which the tank is supported by elastic elements that allow a certain excursion of the tank itself in the direction of movement of the modelling plate.

Said excursion avoids the need to perform the initialization procedure, as the yielding of the elastic elements makes it possible to compensate for the deviations in the size of the tank.

However, as said deviations are not known in advance, during the construction of the first layers of the three-dimensional object the modelling plate will be in an incorrect position with respect to the bottom of the tank, causing the faulty execution of the layers themselves.

Consequently, in the embodiment described above, it is necessary to make some "disposable" initial layers in addition to those strictly related to the geometry of the three-dimensional object to be obtained, and said initial layers will then be eliminated at the end of the processing cycle.

In order to correctly eliminate said initial layers, it will be necessary to interpose some elements that are easy to break between the layers themselves and the object, wherein said easy-to-break elements occupy further layers.

Obviously, said additional layers pose the drawback of increasing the overall processing time and the quantity of resin necessary to produce the object.

Document JPH058305 discloses a stereolithography machine comprising a tank suited to contain a light sensitive resin, provided with a bottom, a modelling plate facing the bottom, a moving unit suited to move the modelling plate, a coupling unit suited to associate the modelling plate with the moving unit and which permits the relative movement between such two members according to a direction orthogonal to the bottom, and finally the stereolithography machine comprises tightening means suited to be operated to lock the movement between the coupling members.

Document EP1946909 discloses a base plate which is locked to a moving unit using a snap attachment having a tightening direction which is orthogonal to the moving direction of the base plate.

The present invention intends to overcome all of the said drawbacks and limitations that are typical of the stereolithography machines of known type described above.

In particular, it is the object of the present invention to provide a stereolithography machine that can be initialized using a simpler procedure compared to that described above.

It is also the object of the present invention to allow the machine to be initialized in a more precise manner, without making the procedure more complicated.

Said objects are achieved by a stereolithography machine according to the main claim. Further details and characteristics are specified in the respective dependent claims.

Advantageously, the fact that it is easier to initialize the machine makes it suited to be used also by unskilled operators.

Still advantageously, the fact that it is easy to initialize the machine of the invention makes it possible to carry out the initialization procedure more rapidly compared to the machines of known type, thus reducing machine standstills.

Still advantageously, the higher initialization precision that can be achieved with the machine of the invention eliminates the need to provide additional initial layers for the three-dimensional object, thus reducing the time required to make the object and the necessary quantity of resin.

Said objects and advantages, together with others that are described below, will be highlighted in the description of a preferred embodiment of the invention that is provided by way of non-limiting example with reference to the attached drawings, wherein:

FIG. 8 shows an exploded view of a part of the coupling unit suited to connect the modelling plate to the moving unit in the stereolithography machine of FIG. 1;

FIG. 9 shows an exploded view of the modelling plate and of a part of the coupling unit suited to connect the modelling plate to the moving unit in the stereolithography machine of FIG. 1;

FIG. 10 shows a front view of the stereolithography machine of FIG. 1 in a different operating configuration;

FIG. 11 shows a side view of the stereolithography machine of FIG. 1 in a further operating configuration.

Figure 1:
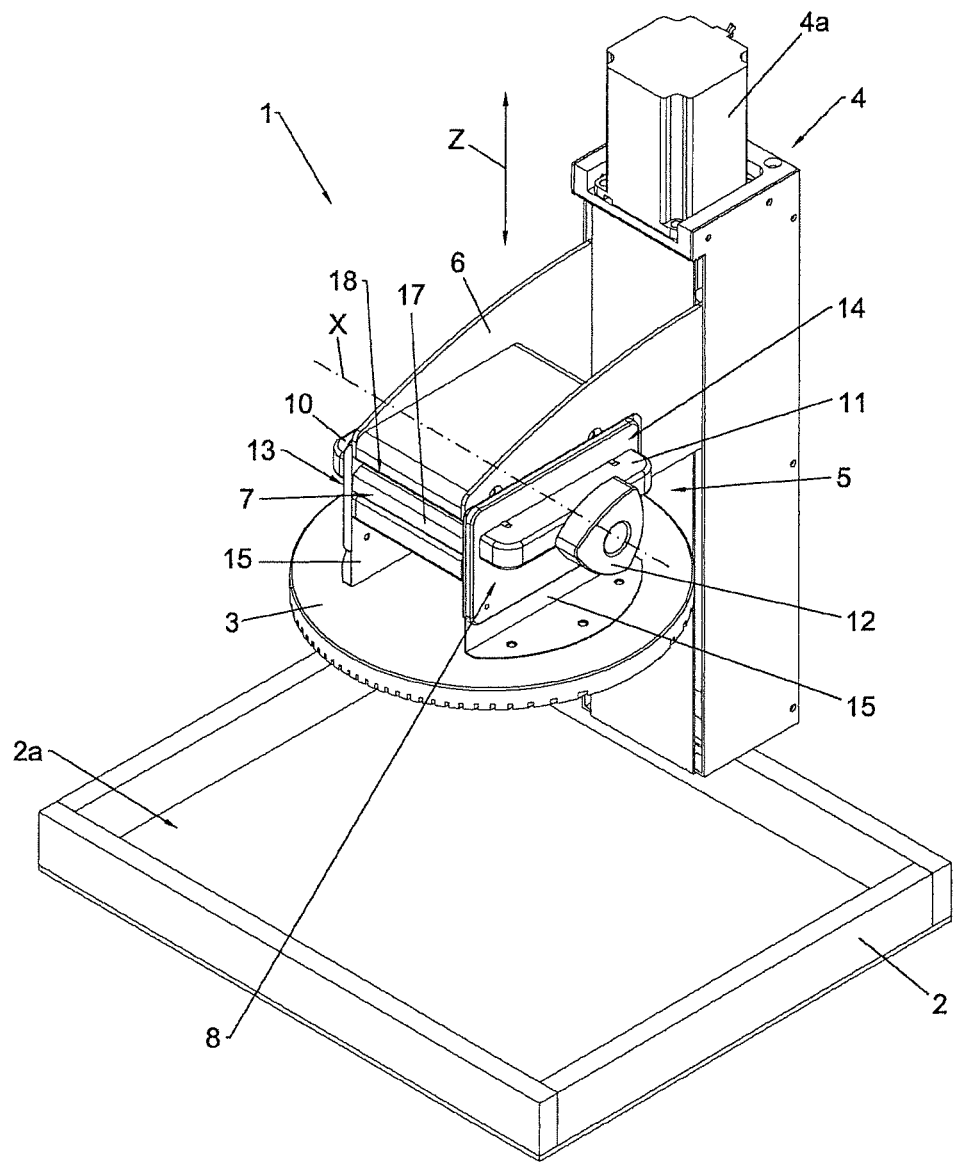
FIG. 1 shows an axonometric view of the stereolithography machine of the invention.
Figure 2:
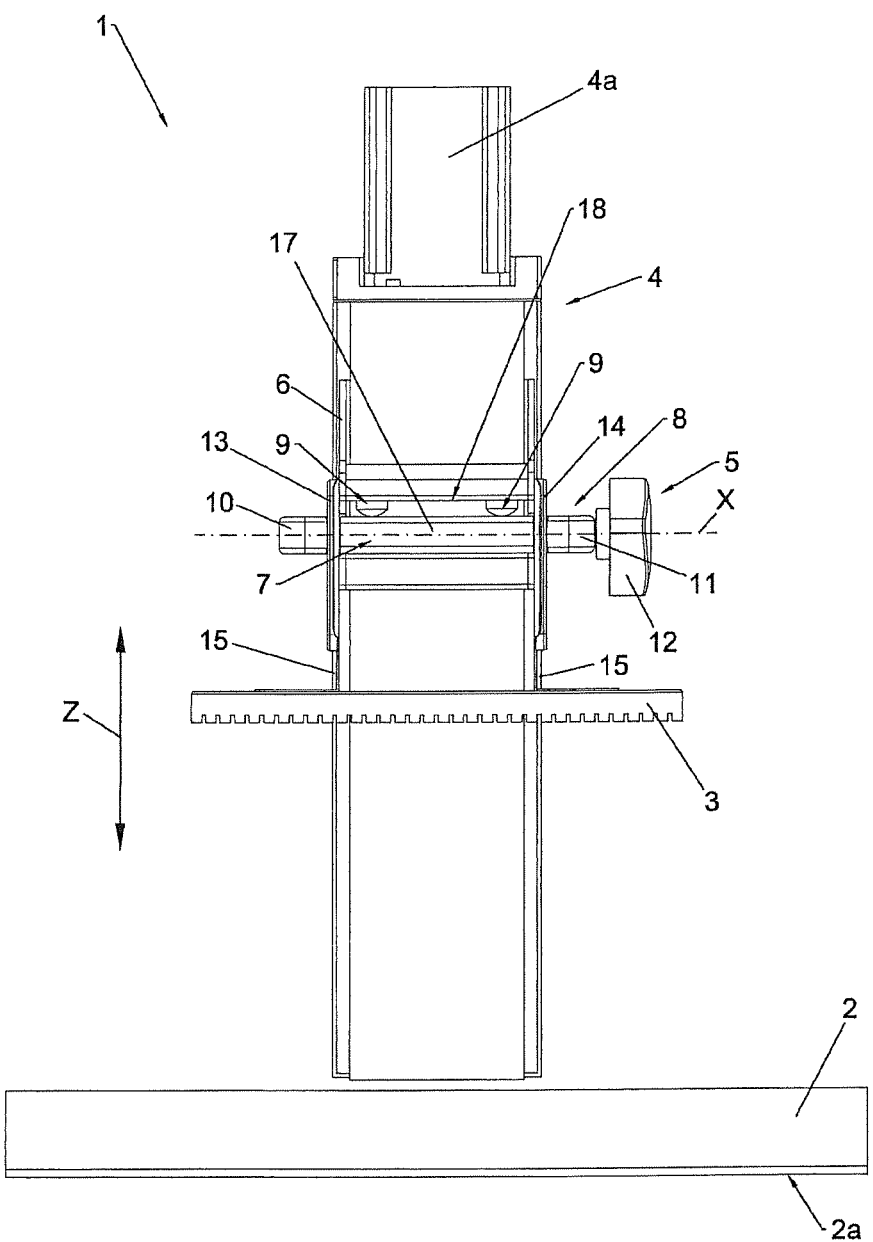
FIG. 2 shows a front view of the stereolithography machine of FIG. 1.

The stereolithography machine that is the subject of the invention, indicated as a whole by 1 in the FIGS. from 1 to 3, comprises a tank 2 suited to contain a light sensitive resin and provided with a bottom 2a.

The machine 1 comprises also a modelling plate 3 facing said bottom 2a and suited to support a three-dimensional object being formed.

There is also a moving unit 4 suited to move the modelling plate 3 according to a direction of movement Z that is orthogonal to the bottom 2a, capable of arranging the modelling plate 3 in contact with the bottom 2a itself and preferably but not necessarily comprising a stepping motor 4a.

The modelling plate 3 is associated with the moving unit 4 through a coupling unit 5, which comprises a first coupling member 6, integral with the moving unit 4, and a second coupling member 7, integral with the modelling plate 3 and movable with respect to the first coupling member 6 according to the direction of movement Z in such a way as to define a plurality of mutual configurations.

The fact that the first coupling member 6 and the moving unit 4 are mutually integral with each other implies that, during the operating steps of the machine 1, the first coupling member 6 is moved by the moving unit 4 in the direction of movement Z.

In this way, the first coupling member 6 is capable of moving the second coupling member 7 associated with it and, therefore, also the modelling plate 3 according to said direction of movement Z.

Preferably, and as shown in FIG. 1, the first coupling member 6 comprises a pair of plate-like bodies, projecting from a supporting column that develops according to the direction of movement Z and with which the plate-like bodies are removably associated so as to be moved according to said direction of movement Z.

The coupling unit 5 makes it possible to carry out the initialization procedure described above adjusting the position of the modelling plate 3 with respect to the moving unit 4 so as to compensate for possible variations in the size of the bottom 2a of the tank 2.

Preferably, the coupling members 6, 7 are configured in such a way as to allow both a translation of the modelling plate 3 with respect to the moving unit 4 in the direction of movement Z and a rotation of the same around a first axis perpendicular to the direction of movement Z.

Still preferably, said coupling members 6, 7 are configured in such a way as to allow the modelling plate 3 to rotate with respect to the moving unit 4 also according to a second axis that is perpendicular to the direction of movement Z and to said first axis.

Advantageously, the rotation of the modelling plate 3 makes it possible to adapt its position to the bottom 2a of the tank 2 to compensate for possible deviations of the latter from the plane that it orthogonal to the direction of movement Z, as shown in FIGS. 10 and 11.

Figure 3:
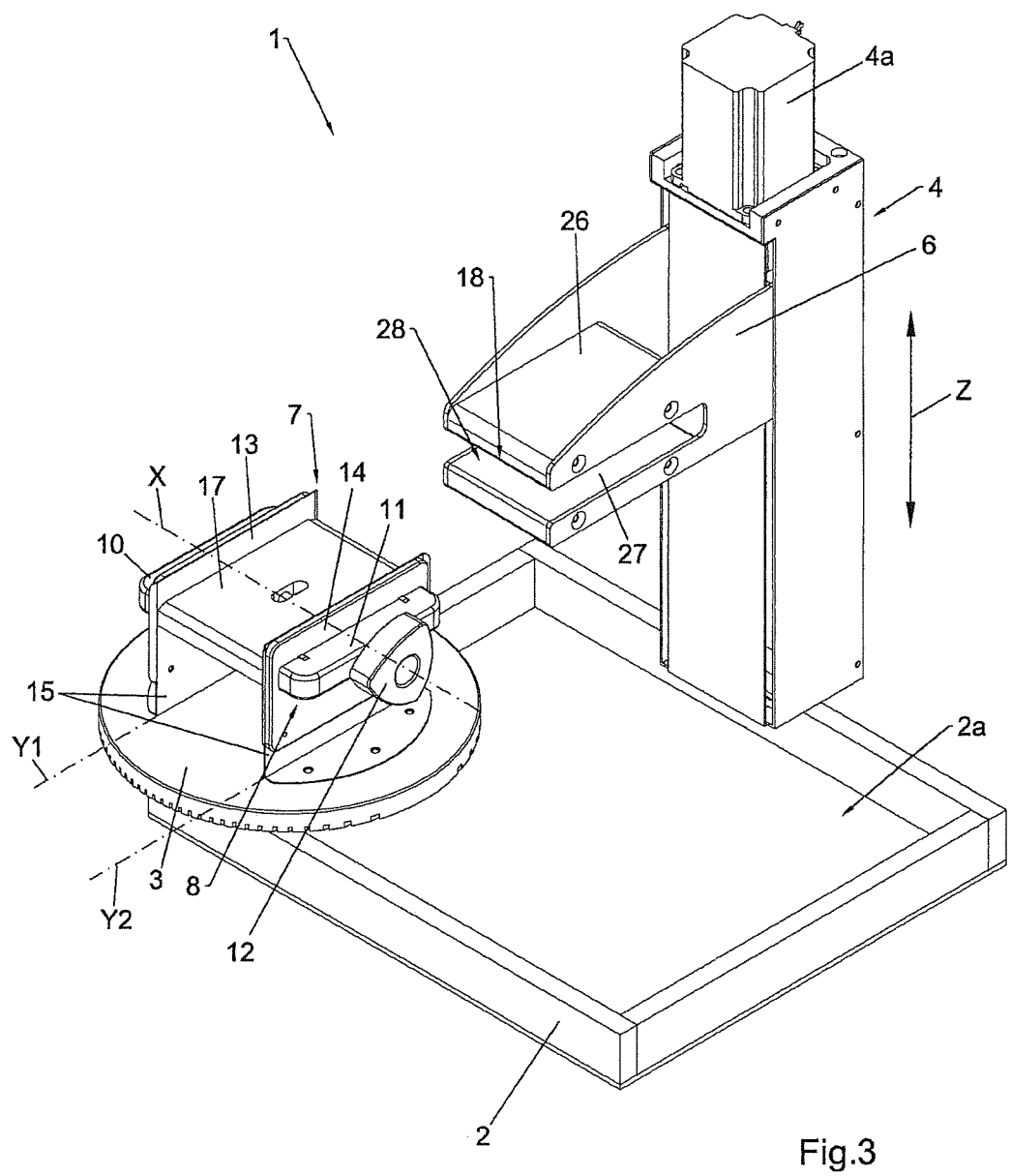
FIG. 3 shows an axonometric view of the stereolithography machine of FIG. 1, with the modelling plate separated from the moving unit.

Preferably, the coupling members 6, 7 are configured in such a way as to make it possible also to remove the modelling plate 3 from the moving unit 4 at the end of the processing cycle, as can be understood from the comparison between FIGS. 1 and 3, in such a way as to be able to comfortably remove the three-dimensional object.

The machine 1 comprises also tightening means 8, suited to be operated so as to lock the mutual movement of the two coupling members 6, 7, and make the modelling plate 3 and the moving unit 4 integral with each other, independently of their mutual configuration.

Said tightening means 8 make it possible to carry out the initialization of the machine 1.

In fact, when the tightening means 8 are in the released configuration, the two coupling members 6 and 7 are free to move with respect to each other, assuming any one of said mutual configurations.

In said condition, the coupling members 6, 7 make it possible to adjust the position of the modelling plate 3 with respect to the moving unit 4, as described above.

Vice versa, when the tightening means 8 are operated, they lock the mutual movement between the coupling members 6, 7, so as to determine a stable position for the modelling plate 3 with respect to the moving unit 4.

According to the invention, the tightening means 8 are configured so as to tighten said two coupling members 6, 7 against each other according to a tightening direction X that is orthogonal to the direction of movement Z of the modelling plate 3.

Due to said configuration, the forces exerted by the tightening means 8 are substantially parallel to the bottom 2a of the tank 2 and, therefore, they do not affect the positioning of the modelling plate 3 in the direction of movement Z. In particular, the tightening means 8 just lock the modelling plate 3 in the position that the latter spontaneously assumes when it is brought in contact with the bottom 2a.

Therefore, said tightening means 8 do not cause a lack of uniformity in the contact pressures between the modelling plate 3 and the bottom 2a.

Consequently, it is not necessary to verify the correct distribution of the contact pressures of the modelling plate 3.

The object of facilitating the initialization procedure of the machine 1 has thus been achieved, thus making the latter suited to be used even by an unskilled operator.

As it is not necessary to interpose a paper sheet between the modelling plate 3 and the bottom 2a to verify the distribution of the contact pressures, it is possible to avoid the positioning error due to the fact that the thickness of the paper sheet is not precisely known, thus achieving the further object of obtaining an extremely precise initialization procedure.

Consequently, the processing of the three-dimensional object can be started with no need to provide "disposable" additional layers.

Therefore, advantageously, it is possible to reduce the time necessary to produce the object, as well as the quantity of resin used for this purpose.

Still advantageously, the absence of additional layers eliminates the need to remove them with a successive finishing operation, thus further increasing the ease of use of the machine 1.

The fact that it is not necessary to use a paper sheet to control the distribution of pressures brings the further advantage of allowing the initialization procedure to be carried out even if there is resin in the tank 2, with no need to empty it.

Furthermore, once the modelling plate 3 has been placed in contact with the bottom 2a and has been fixed to the moving unit 4, the position obtained in this way can be directly used by the control system of the moving unit 4 as a reference position for the processing cycle.

Therefore, it is possible to start the processing cycle with no need to carry out any further setting up of the machine, to further advantage in terms of ease of use and processing times.

Preferably, the coupling unit 5 is configured in such a way as to define a stop position for the second coupling member 7 with respect to the first coupling member 6 during its movement towards the bottom 2a.

Furthermore, the coupling unit 5 comprises forcing means 9 configured in such a way as to force the second coupling member 7 in said stop position.

Advantageously, said forcing means 9 ensure that the modelling plate 3 is maintained in contact with the bottom 2a of the tank 2 during the initialization procedure.

Said forcing means 9 may comprise the dead load of the modelling plate 3, which tends to push the latter downwards overcoming any possible friction.

In any case, the forcing means 9 preferably comprise thrusting means 19 that are advantageously capable of guaranteeing the precise contact of the modelling plate 3 with the bottom 2a.

Figure 7:
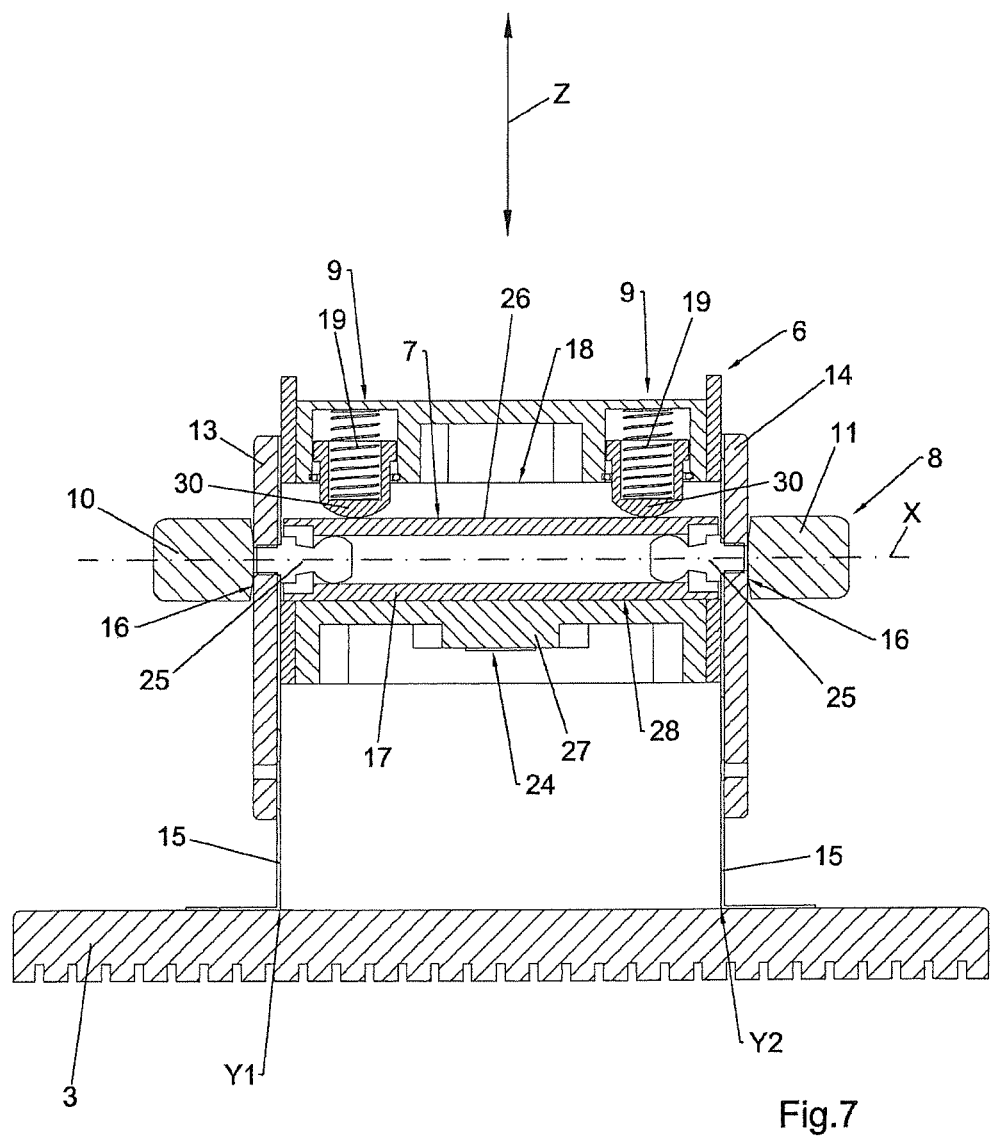
FIG. 7 shows a front sectional view of the modelling plate associated with the moving unit of the stereolithography machine of FIG. 1.

As regards the tightening means 8, preferably and as can be observed in FIG. 7, they comprise two jaws 10, 11 opposing each other and provided with corresponding contact surfaces 16 facing the coupling members 6, 7.

The tightening means 8 comprise also adjusting means 12 suited to modify the mutual distance of said jaws 10, 11, said adjusting means preferably comprising a screw 21, visible in FIG. 9, having its two ends respectively associated with the two jaws 10, 11 and preferably suited to be operated by means of a knob 32.

Advantageously, said jaws 10, 11 make it possible to tighten the two coupling members 6, 7 in a particularly simple manner.

Preferably but not necessarily, said jaws 10, 11 are arranged on corresponding opposite sides with respect to the coupling members 6, 7 and their contact surfaces 16 mutually face each other, in such a way as to tighten the coupling members 6, 7 from the outside through a mutual approaching movement.

According to a variant embodiment not illustrated in the drawings, the two jaws 10, 11 can be arranged with their respective contact surfaces 16 mutually opposing each other, in such a way as to tighten the two coupling members 6, 7 from the inside by moving them away from each other.

In both of the cases described above, the second coupling member 7 preferably comprises two coupling elements 13, 14, revolvingly associated with the modelling plate 3 according to respective rotation axes Y1, Y2, the jaws 10, 11 being arranged so that they face said coupling elements 13, 14, respectively.

In particular, said rotation axes Y1, Y2 are perpendicular to the direction of movement Z and are mutually parallel and spaced from each other, in such a way that the rotation of the coupling elements 13, 14 around said axes Y1, Y2 makes it possible to incline the modelling plate 3 with respect to the moving unit 4 around the first axis previously mentioned, as shown in FIG. 10.

At the same time, said coupling elements 13, 14 also allow a rotation of the modelling plate 3 around the second axis previously mentioned, as shown in FIG. 11.

Preferably, said revolving connection of the coupling elements 13, 14 to the modelling plate 3 is obtained by associating the coupling elements 13, 14 with the modelling plate 3 through respective connecting portions 15, flexible around the corresponding rotation axes Y1, Y2 mentioned above.

It is also evident that, in variant embodiments of the invention, said connecting portions 15 can be replaced by hinge elements.

Preferably and as shown in FIG. 7, the contact surface 16 of each jaw 10, 11 facing the corresponding coupling element 13, 14 has a convex shape.

Said convex shape allows the jaws 10, 11 to exert their tightening action also in an inclined position with respect to the coupling elements 13, 14, thus further facilitating the initialization procedure.

Said possibility makes it also possible to constrain each jaw 10, 11 to a corresponding coupling element 13, 14 in a direction perpendicular to the tightening direction X, for example using the same tightening screw 21, which is arranged so that it passes through holes belonging to both of the coupling elements 13, 14, as shown in FIG. 9.

The configuration just described above makes it possible to use the jaws 9, 10 as holding grips that allow the modelling plate 3 to be safely held during and after its removal from the moving unit 4.

Preferably, there are means suited to prevent the rotation of the jaws 10, 11 around said screw 21 and preferably comprising, as shown in FIG. 9, recesses 34 belonging to the contact surface 16 of each jaw and slidingly associated with corresponding reference bodies 33 according to the tightening direction X.

Preferably and as shown in FIG. 7, the coupling unit 5 comprises a spacer element 17 which is interposed between the coupling elements 13, 14 and whose width, according to the tightening direction X, does not exceed and preferably is smaller than the width of the first coupling member 6 according to the same direction, in such a way as to allow the actual tightening of the coupling elements 13, 14 against the first coupling member 6.

The spacer element 17 is constrained to each coupling element 13, 14 in a direction that is perpendicular to the tightening direction X, at the same time being able to rotate with respect to the coupling elements 13, 14 themselves.

Said constraint makes it possible to use the spacer element 17 in cooperation with the thrusting means 19 in order to thrust the modelling plate 3 towards the bottom 2a of the tank 2.

Preferably, the constraint just described above is obtained through a plurality of pins 25, visible also in FIG. 9, each one of which has a first end fixed to the coupling elements 13, 14 and the second opposite end removably inserted in a corresponding recess provided in the spacer element 17.

Preferably, said second end has a spherical shape, in such a way as to allow both the rotation of the spacer element 17 with respect to the coupling elements 13, 14 and its translation according to the tightening direction X.

The first coupling member 6 of the moving unit 4 is suited to be positioned between the coupling elements 13, 14 and comprises a recess 18 configured so as to slidingly house said spacer element 17 according to a direction incident on the direction of movement Z and to allow it to move according to the direction of movement Z.

The recess 18 is delimited, on opposing sides with respect to the direction of movement Z, respectively by an upper plate 26 and by a lower plate 27. In particular, the surface 28 of the lower plate 27 defines the end of stroke of the spacer element 17 in the direction of movement Z, corresponding to said stop position of the second coupling member 7 with respect to the first coupling member 6.

Preferably and as shown in FIG. 7, the thrusting means 19 that force the second coupling member 7 in the stop position are arranged in the recess 18 and face the spacer element 17, in such a way as to thrust the latter in the stop position described above.

Still preferably and as shown also in FIG. 8, said thrusting means 19 comprise a plurality of thrusting elements 30, preferably three or more than three, slidingly associated with the first coupling member 6 according to the direction of movement Z and maintained in such a position that they project inside the recess 18 through the action of corresponding springs.

Preferably, said thrusting elements 30 have a spherical surface that, advantageously, ensures good contact with the spacer element 17 even when the latter is inclined and that, furthermore, facilitates the introduction of the spacer element 17 inside the recess 18 during the coupling of the modelling plate 3 with the moving unit 4.

Preferably, the sliding movement of the thrusting elements 30 in the direction of movement Z is limited by stop means that prevent them from coming off the first coupling member 6 and that preferably comprise elastic rings 31.

Preferably, the machine 1 comprises also stop means 20 configured so as to prevent the activation of the tightening means 8 when the second coupling member 7 is arranged in the stop position with respect to the first coupling member 6.

Advantageously, the presence of said stop means 20 prevents the modelling plate 3 from being tightened to the moving unit 4 while the modelling plate 3 is lifted from the bottom 2a of the tank 2.

In this way, the relative movement between the coupling members 6 and 7 during the initialization procedure is ensured, thus avoiding any damage to the bottom 2a of the tank 2 during the downward movement of the modelling plate 3.

Figure 4:
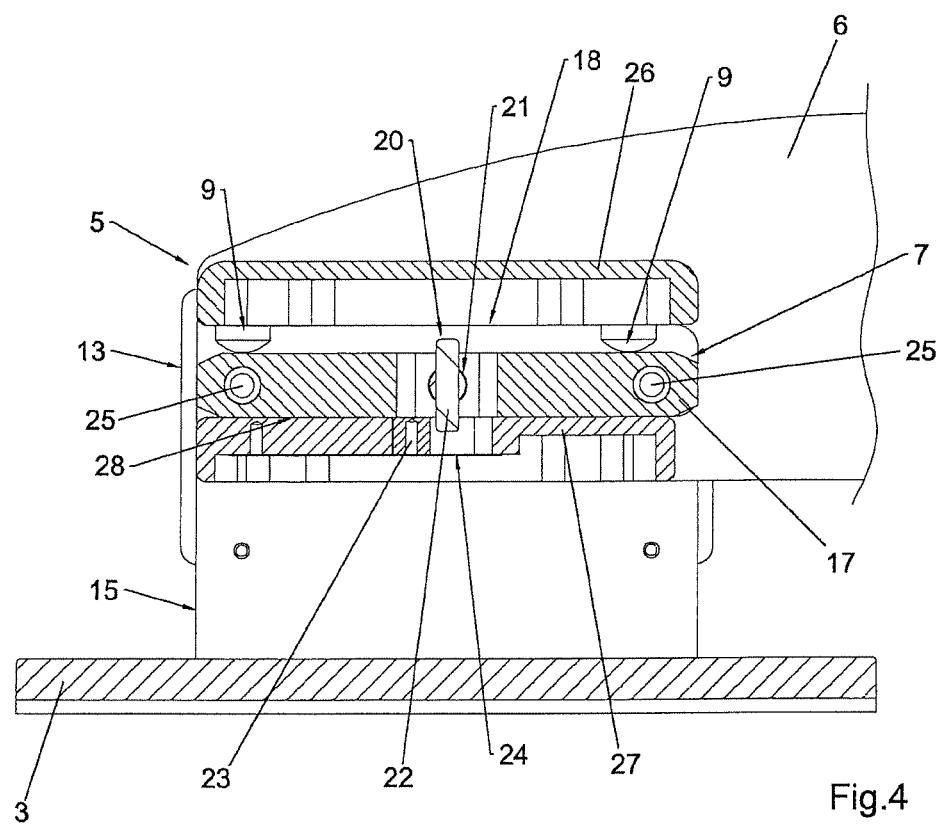
FIGS. 4 and 5 show side sectional views of the modelling plate associated with the moving unit of the stereolithography machine of FIG. 1, in two different operating configurations.

Preferably and as shown in FIG. 4, the stop means 20 comprise a shaped body 22 projecting from the screw 21 in a direction that is orthogonal to the longitudinal axis of the latter, and a stop body 23 belonging to the moving unit 4.

Figure 6:
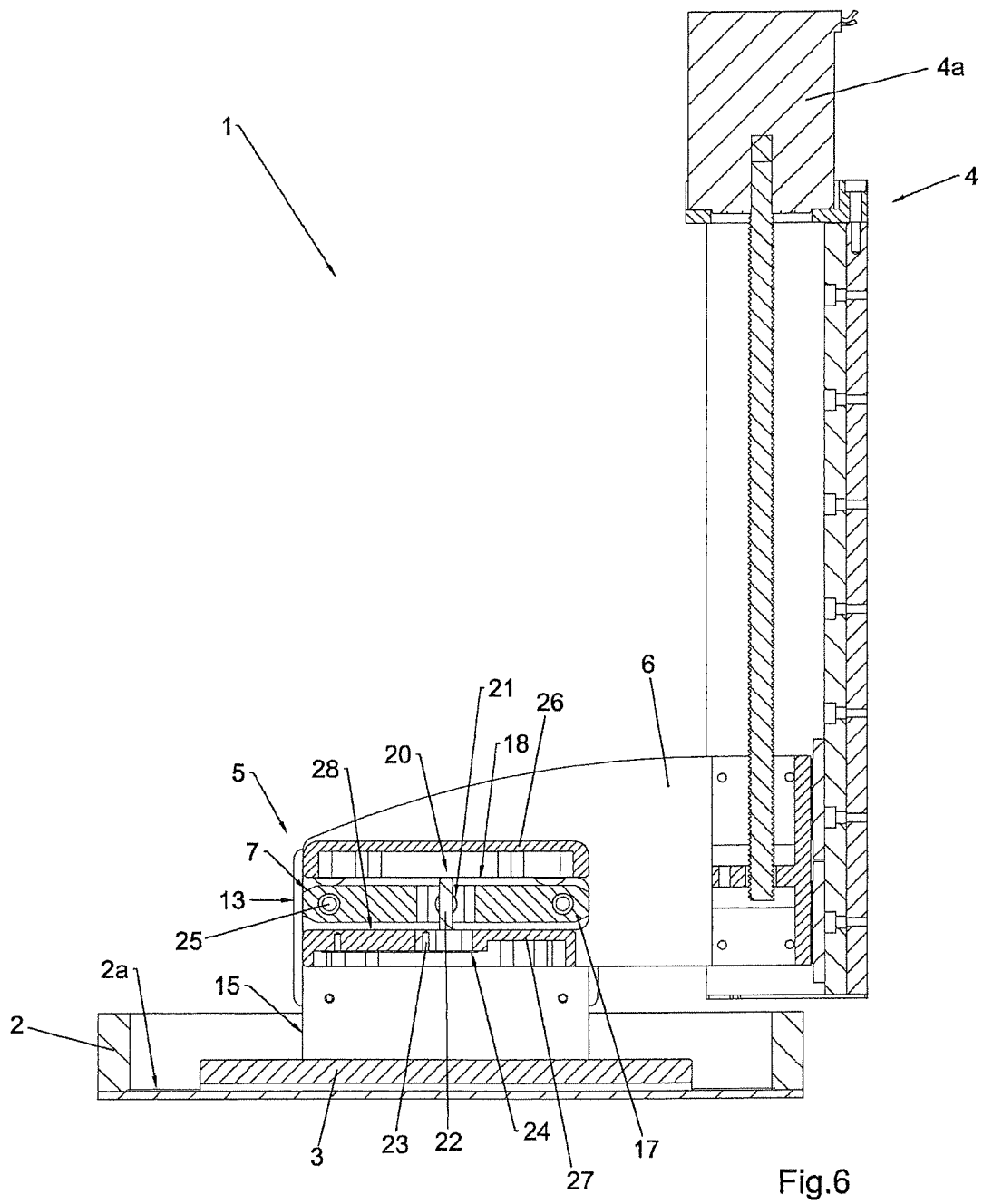
FIG. 6 shows a side sectional view of the stereolithography machine of FIG. 1, in a further operating configuration.

The shaped body 22 and the stop body 23 are configured in such a way that they interfere with each other during the rotation of the screw 21 when the modelling plate 3 is arranged in said stop position with respect to the moving unit 4, as shown in FIG. 4, and that they are released from each other when the modelling plate 3 is arranged in the spaced position mentioned above with respect to the moving unit 4, as shown in FIG. 6.

It can thus be understood that when the modelling plate 3 is rested on the bottom 2a of the tank 2, a sufficient displacement of the moving unit 4 towards the bottom 2a of the tank 2 leads to the displacement of the stop body 23 with respect to the shaped body 22 in such a way as to release the latter.

Consequently, in said position, the tightening means 8 can be operated in such a way as to fix the modelling plate 3 to the moving unit 4.

Figure 5:
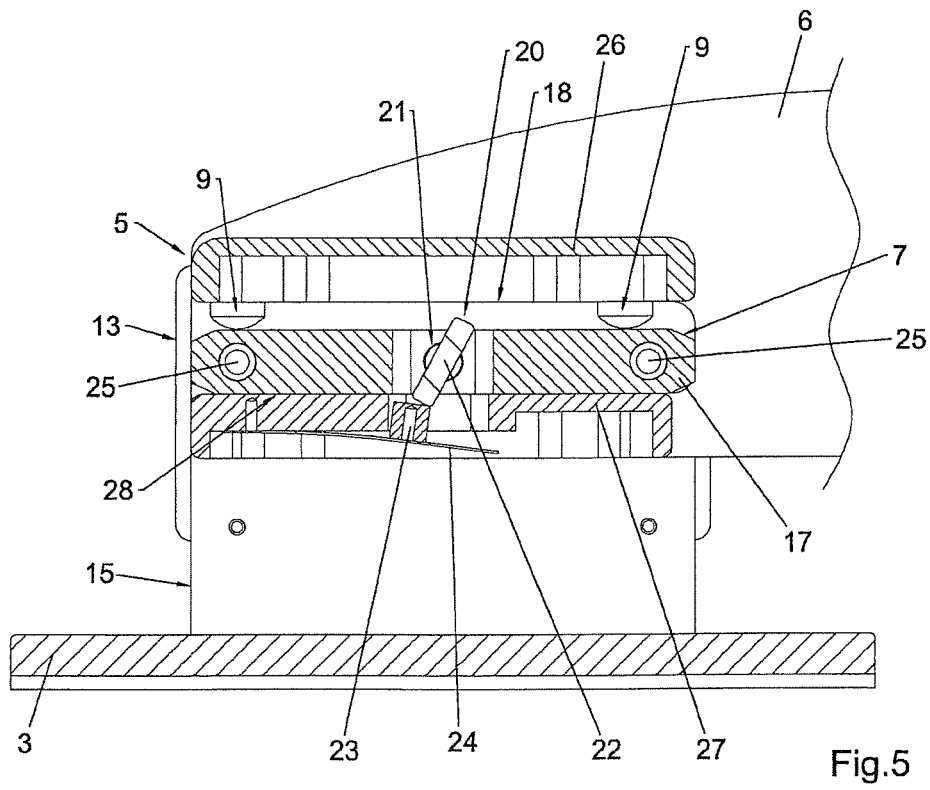

Preferably, the stop body 23 is elastically associated with the moving unit 4 in such a way that the shaped body 22 can move it from its constrained position when the screw 21 is rotated in a direction corresponding to the loosening of the jaws 10, 11 from the coupling elements 13, 14, as shown in FIG. 5, but not during the rotation of the screw 21 in the rotation direction corresponding to the tightening of the jaws 10, 11 against the coupling elements 13, 14.

Advantageously, said configuration of the stop body 23 allows the loosening of the jaws 10, 11 independently of the position of the modelling plate 3 with respect to the moving unit 4, so as to always allow the removal of the modelling plate 3.

The requisite described above is preferably met by connecting the stop body 23 to the lower plate 27 of the moving unit 4 through a flexible foil 24 preferably made of harmonic steel.

In practice, the procedure of initialization of the stereolithography machine 1 described above is carried out by arranging the modelling plate 3 associated with the moving unit 4 and with released tightening means 8, in such a way as to allow the relative movement of said two components with respect to each other.

Successively, the operator activates the moving unit 4 in such a way as to arrange the modelling plate 3 in contact with the bottom 2a of the tank 2, as shown in FIG. 6.

In this condition, the modelling plate 3 is in a stable position and any further activation of the moving unit 4 may cause only the displacement of the first coupling member 6 with respect to the second coupling member 7, given that the latter is integral with the modelling plate 3.

The activation of the moving unit 4 continues until the position of the second coupling member 7 with respect to the first coupling member 6 according to the direction of movement Z is an intermediate position among those allowed and, in any case, is such that the stop means 20 are released.

Successively, the operator activates the tightening means 8 in such a way as to fix the modelling plate 3 to the moving unit 4.

It is thus possible to immediately start the processing cycle, as the control system of the machine 1 can store the position of the moving unit 4 as reference position for the processing cycle.

It can thus be understood from the preceding description that the stereolithography machine described above achieves all the objects of the invention.

In particular, the fact that the tightening means of the machine of the invention act in a direction that is parallel to the bottom of the tank eliminates the complex series of operations suited to adjust the modelling plate and required for the initialization of the machines of known type, thus making the procedure much more simple.

Furthermore, the fact that the tightening means act in a direction that is parallel to the bottom of the tank avoids both the generation of non-homogeneous contact pressures between the modelling plate and the bottom of the tank, which would lead to the imprecise positioning of the modelling plate itself, and the need to check the positioning precision by means of a spacer element interposed between the plate and the bottom of the tank, which would introduce a further variable in the positioning.

The invention claimed is:

1. Stereolithography machine comprising:
   a tank suited to contain a light sensitive resin, provided with a bottom;
   a modelling plate facing said bottom;
   a moving unit suited to move said modelling plate according to a direction of movement orthogonal to said bottom;
   a coupling unit suited to associate said modelling plate with said moving unit, comprising a first coupling member integral with said moving unit and a second coupling member integral with said modelling plate and movable with respect to said first coupling member at least according to said direction of movement, in such a way as to define a plurality of mutual configurations;
   tightening means suited to be operated to lock the movement between said coupling members in any of said mutual configurations in such a way as to make said modelling plate and said moving unit integral with each other;
   characterized in that said tightening means are suited to be operated so as to tighten said coupling members against each other according to a tightening direction that is orthogonal to said direction of movement;
   wherein said coupling unit defines a stop position for said second coupling member with respect to said first coupling member during the movement of said second coupling member towards said bottom and comprises forcing means configured to force said second coupling member in said stop position and
   wherein, said tightening means comprise two jaws provided with respective contact surfaces facing said coupling members, and adjusting means suited to modify the mutual distance between said two jaws.

2. Machine according to claim 1, characterized in that said first coupling member and said second coupling member are configured so as to allow both a translation of said modelling plate with respect to said moving unit in said direction of movement and a rotation of said modelling plate with respect to said moving unit according to a first axis perpendicular to said direction of movement.

3. Machine according to claim 1, characterized in that said first coupling member and said second coupling member are configured so as to allow said modelling plate to be removed from said moving unit.

4. Machine according to claim 1, characterized in that said forcing means comprises a spring.

5. Machine according to claim 1, characterized in that said second coupling member comprises two coupling elements revolvingly associated with said modelling plate according to respective rotation axes, said rotation axes being perpendicular to said direction of movement and parallel to and spaced from each other, each one of said two jaws facing a corresponding one of said two coupling elements.

6. Machine according to claim 5, characterized in that said coupling elements are associated with said modelling plate through respective connection portions that are flexible around said respective rotation axes.

7. Machine according to claim 5, characterized in that each one of said two jaws is constrained to a corresponding coupling element in a direction perpendicular to said tightening direction, the corresponding contact surface facing said coupling element and having a convex shape.

8. Machine according to claim 7, characterized in that said coupling unit comprises a spacer element interposed between said coupling elements, constrained to each one of them in a direction perpendicular to said tightening direction and whose width, according to said tightening direction, is smaller than the width of said first coupling member according to said tightening direction, said first coupling member being suited to be positioned between said coupling elements and comprising a recess configured to house said spacer element according to a direction incident on said direction of movement and to allow said spacer element to move according to said direction of movement.

9. Machine according to claim 8, characterized in that said forcing means comprise thrusting means arranged in said recess and cooperating with said spacer element so as to force said modelling plate in said stop position.

10. Machine according to claim 4, characterized in that it comprises stop means configured to prevent the activation of said tightening means when said second coupling member is arranged in said stop position with respect to said first coupling member.

11. Machine according to claim 10, characterized in that said adjusting means comprise a screw whose two ends are respectively associated with said two jaws, said stop means comprising a shaped body projecting from said screw in a direction orthogonal to the longitudinal axis of said screw and a stop body belonging to said moving unit, said shaped body and said stop body being configured to interfere with each other during the rotation of said screw when said modelling plate is arranged in said stop position with respect to said moving unit and to be released from each other when said modelling plate is arranged in said spaced position with respect to said moving unit.

12. Machine according to claim 11, characterized in that said stop body is elastically associated with said moving unit, in such a way that said shaped body can move it when said screw is rotated in a direction corresponding to the loosening of said jaws from said coupling elements.

* * * * *